United States Patent
Kang et al.

(10) Patent No.: US 9,342,720 B2
(45) Date of Patent: May 17, 2016

(54) FUNCTION EXECUTION BASED ON TAG INFORMATION

(71) Applicant: KT Corporation, Seongnam-si (KR)

(72) Inventors: Moon-Soon Kang, Seongnam-si (KR); Jang-Hyuk Park, Seoul (KR)

(73) Assignee: KT CORPORATION, Seongnam (KR)

( * ) Notice: Subject to any disclaimer, the term of this patent is extended or adjusted under 35 U.S.C. 154(b) by 330 days.

(21) Appl. No.: 13/909,638

(22) Filed: Jun. 4, 2013

(65) Prior Publication Data

US 2013/0335201 A1     Dec. 19, 2013

(30) Foreign Application Priority Data

Jun. 18, 2012    (KR) .................. 10-2012-0065067

(51) Int. Cl.

| | |
|---|---|
| *G05B 15/02* | (2006.01) |
| *G06K 7/10* | (2006.01) |
| *H04M 1/725* | (2006.01) |
| *G06Q 30/02* | (2012.01) |
| *G06Q 30/06* | (2012.01) |

(52) U.S. Cl.
CPC ............ *G06K 7/10366* (2013.01); *G05B 15/02* (2013.01); *H04M 1/7253* (2013.01); *G06Q 30/0251* (2013.01); *G06Q 30/06* (2013.01); *H04M 2250/04* (2013.01); *H04M 2250/12* (2013.01)

(58) Field of Classification Search
CPC .............. G05B 15/02; G06K 7/10366; H04M 2250/04; H04M 2250/12; G06Q 30/06; G06Q 30/0251
See application file for complete search history.

(56) References Cited

U.S. PATENT DOCUMENTS

| | | | | |
|---|---|---|---|---|
| 2004/0238635 | A1* | 12/2004 | Ozaki .................. | G06K 7/0008 235/451 |
| 2007/0074024 | A1* | 3/2007 | Cheong .................. | G06Q 30/02 713/171 |

* cited by examiner

*Primary Examiner* — Andrew Bee

(74) *Attorney, Agent, or Firm* — Brundidge & Stanger, P.C.

(57) ABSTRACT

In one example embodiment, an end device includes a memory configured to store function information regarding at least one predefined function and tag information regarding at least one electronic tag that is associated with the at least one predefined function; a reader configured to read tag identification information received from a detected electronic tag located within a predetermined range of the end device; and a processor configured to select a predefined function from among the at least one predefined function based on the stored tag information and the read tag identification information and perform the selected predefined function.

9 Claims, 12 Drawing Sheets

FUNCTION EXECUTION BASED ON TAG INFORMATION

TECHNICAL FIELD

The embodiments described herein pertain generally to schemes for executing at least one predefined function that is associated with an electronic tag.

BACKGROUND

Mobile communication systems continue to grow in popularity and have become an integral part of both personal and business communications. Some mobile devices incorporate contactless card technology and/or Near Field Communication (NFC) chips. Near Field Communications technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing.

SUMMARY

In one example embodiment, an end device includes a memory configured to store function information regarding at least one predefined function and tag information regarding at least one electronic tag that is associated with the at least one predefined function; a reader configured to read tag identification information received from a detected electronic tag located within a predetermined range of the end device; and a processor configured to select a predefined function from among the at least one predefined function based on the stored tag information and the read tag identification information and perform the selected predefined function.

In another example embodiment, a server includes a memory configured to store service information regarding at least one predefined service and tag information regarding at least one electronic tag that is associated with the at least one predefined service; a receiver configured to receive, from the first device, a service request that includes tag identification information read from a detected electronic tag located within a predetermined range of the first device; a service selector configured to select a predefined service from among the at least one predefined service based on the stored tag information and the received tag identification information; and a transmitter configured to transmit the service information regarding the selected predefined service to the first device.

In yet another example embodiment, a system includes a first device configured to read tag identification information regarding a detected electronic tag located within a predetermined range of the first device, and transmit a service request that includes the read tag identification information; and a server configured to receive, from the first device, the service request, and provide the first device with service information regarding a predefined service that is associated with the read tag identification information. The first device is further configured to perform the predefined service based on the provided service information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
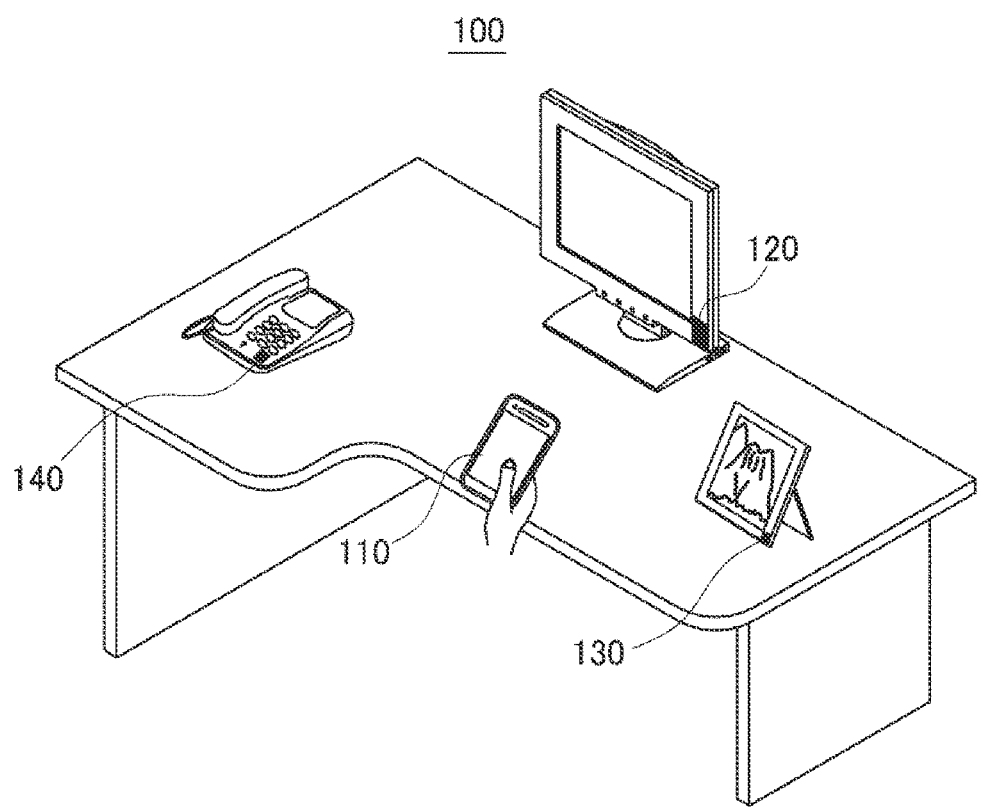
FIG. 1 shows an example system configuration in which one or more embodiments of function execution based on tag information may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In some examples, a user of an end device may pre-register at least one function (e.g., "play music," "play a movie," "call a friend," etc) in association with electronic tag information in a local memory or in a remote memory. The electronic tag information may refer to any type of information that is stored in the electronic tag and may identify a corresponding one of the pre-registered functions. By way of example, but not limitation, the electronic tag information may include at least one of a unique identifier of the electronic tag, a uniform resource identifier (URI) of the electronic tag, a telephone number of an owner or an entity of the electronic tag stored in the electronic tag and/or associated content, a text (e.g., a name of the owner or entity) stored in the electronic tag, a vCard file stored in the electronic tag, or a serial number stored in the electronic tag, etc.

By way of example, but not limitation, the end device may be configured to read the electronic tag information by using a reader coupled to the end device. The reader may include at least one of a radio frequency identification reader, a near field communication reader, a barcode reader, a quick response code reader, etc. At least one of the unique identifier, uniform resource identifier (URI), telephone number, text, vCard file, or serial number included in the read electronic tag information may be displayed on a display or a screen coupled to the end device. Then, the end device may be configured to receive an input that selects one of them included in the read electronic tag information.

Further, when the end device receives the input, the end device may be configured to display a function list which includes at least one function (e.g., "play music," "playa movie," "call a friend," etc) executable on/by the end device. Then, the end device may be configured to receive an input that selects one or more functions from among the displayed at least one function.

When the end device receives the input that selects the at least one function, the end device may be configured to match the selected electronic tag information to the selected at least one function. Then, the end device may also be configured to store the matching result in the local memory or the remote memory as a predefined function associated with the electronic tag information.

Thereafter, when the end device reads electronic tag information which is the same as the electronic tag information associated with the predefined function from the electronic tag, the predefined function may be automatically performed on/by the end device.

By way of example, but not limitation, it is assumed that the user of the end device selects the unique identifier of the electronic tag and selects a function of "play music." Then, the end device may register the selected function in association with the unique identifier of the electronic tag as a predefined function. Then, if the end device reads electronic tag information, which includes the unique identifier of the electronic tag from the electronic tag again, music is automatically played on the end device.

In some examples, the end device may further store reference motion information regarding a motion that is to be enacted to execute the predefined function.

Thereafter, when the end device reads electronic tag information which is the same as the electronic tag information associated with the predefined function from the electronic tag while a motion which corresponds to the motion defined by the reference motion information is enacted with the end device, the predefined function may be automatically performed on/by the end device.

FIG. 1 shows an example system configuration 100 in which one or more embodiments of function execution based on tag information may be implemented. As depicted in FIG. 1, system configuration 100 includes, at least, an end device 110, a first electronic tag 120, a second electronic tag 130 and a third electronic tag 140. With respect to first electronic tag 120, second electronic tag 130, and third electronic tag 140 may be attached to a surface of an object, for example, a computer monitor, a picture frame, a telephone, etc. Alternatively, respective of first electronic tag 120, second electronic tag 130 and third electronic tag 140 may be inserted in the example objects as an electronic chip.

As referenced herein, an "electronic tag," also known as a "smart tag" or "RFID tag," may be an electronic identification device that includes a chip and antenna.

End device 110 may refer to at least one of a mobile phone, a portable device, a notebook, a personal computer or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access and Wibro (Wireless Broadband Internet) terminals.

By way of example, but not limitation, with respect to first electronic tag 120, second electronic tag 130 and third electronic tag 140 may include at least one of a radio frequency identification (RFID) tag, a near field communication (NFC) tag, a smart tag, a barcode, a quick response code, etc. Further, as referenced herein, an "electronic tag" may be an electronic identification device that includes a chip and antenna.

In some embodiments, end device 110 may include a reader that is enabled to read information from an electronic tag (e.g., first electronic tag 120, second electronic tag 130 or third electronic tag 140). By way of example, but not limitation, the reader coupled to end device 110 may include one or more of a radio frequency identification reader, a near field communication reader, a barcode reader, a quick response code reader, etc.

End device 110 may be configured to store tag information that is read from at least one electronic tag. By way of example, but not limitation, end device 110 may be configured to store tag information that is read from electronic tag 120, second electronic tag 130 and third electronic tag 140. The tag information may refer to any type of information that is stored in the at least one electronic tag and corresponds to each function to identify the each function. Non-limiting examples of the tag information may include at least one of a unique identifier of the at least one electronic tag, a uniform resource identifier (URI) of the at least one electronic tag, a telephone number of an owner and/or entity that exercises control over the at least one electronic tag or associated content, a text (e.g., a name of the owner and/or entity) stored in the at least one electronic tag, a vCard file that is stored in the at least one electronic tag, or a serial number that is enabled to identify the at least one electronic tag and stored in the at least one electronic tag.

End device 110 may be further configured to store function information regarding at least one function which is enabled to be executed by/on end device 110 in a local memory. The at least one function may be associated with the at least one electronic tag. In some embodiments, function information regarding a single function may be stored in the local memory of end device 110 in association with tag information regarding a single electronic tag. By way of example, but not limitation, the single function (e.g., calling acquaintance, playing a movie, playing music, activating an application, opening a web browser, etc.) may be associated with one of a unique identifier of the single electronic tag, a uniform resource identifier (URI) of the single electronic tag, a telephone number stored in the single electronic tag, a text stored in the single electronic tag, a vCard file stored in the single electronic tag, or a serial number stored in the single electronic tag. When end device 110 reads the tag information which is associated with the function information regarding the single function, end device 110 may be configured to perform the single function.

In some other embodiments, function information regarding multiple functions may be stored in the local memory in association with tag information regarding a single electronic tag. Each of the multiple functions may be associated with one of the unique identifier of the single electronic tag, the uniform resource identifier (URI) of the single electronic tag, the telephone number, the text, the vCard file, or the serial number stored in the single electronic tag. By way of example, but not limitation, one function (e.g., "playing a movie" among the multiple functions may be associated with the unique identifier of the single electronic tag, another function (e.g., 'playing a music') among the multiple functions may be associated with the uniform resource identifier (URI) of the single electronic tag and other function (e.g., "calling an acquaintance") among the multiple functions may be associated with the telephone number stored in the single electronic tag. When end device 110 reads the tag information that is associated with the function information regarding the multiple functions, end device 110 may be configured to perform the multiple functions.

In some embodiments, the at least one function may be predefined and stored in association with the at least one electronic tag by an owner and/or entity that exercises control over end device 110. As set forth, non-limiting examples of the predefined function may include any process or actions executable by end device 110, such as calling an acquaintance, playing a movie, playing music, activating an application, opening a web browser, etc. By way of example, but not limitation, the function information may include a telephone number of the acquaintance, a name of a movie to be played, a name of a song to be played, a running time of the movie or the music, an application list, etc. End device 110 may be configured to perform the predefined function based on the function information.

The stored function information may include an execution instruction regarding the least one predefined function and additional setting information regarding the at least one predefined function. By way of example, but not limitation, the execution instruction may be an instruction that initiates the predefined function on end device 110 and the additional setting information may include additional instructions regarding such as playing order of multiple music, repeat number of playing a movie or repeat number of playing a music, etc. In some embodiments, end device 110 may be configured to receive an input that selects and indicates the additional setting information (e.g., an order of songs to be played, an allowed number of repeated plays of a movie or a song or song list, etc) and store the additional setting information in association with the tag information. Then, afterwards, end device 110 may perform the predefined function according to the additional setting information. By way of example, but not limitation, end device 110 may play and repeat a music according to the repeat number as the additional setting information.

In some embodiments, end device 110 may be configured to read tag identification information received from a detected electronic tag located within a predetermined communication range of end device 110 by using the reader coupled to end device 110. By way of example, but not limitation, the tag identification information may include at least one of a unique identifier of the detected electronic tag, a uniform resource identifier (URI) of the detected electronic tag, a telephone number, a text, a vCard file, or a serial number stored in the detected electronic tag. By way of example, end device 110 may read tag identification information from at least one of first electronic tag 120, second electronic tag 130 or third electronic tag 140 by using the reader coupled to end device 110.

In some embodiments, end device 110 may be configured to select a predefined function from among the at least one predefined function based on the tag information stored in the local memory and the tag identification information read by the reader. By way of example, but not limitation, end device 110 may match the tag information including at least one of the unique identifier of the at least one electronic tag, the uniform resource identifier (URI) of the at least one electronic tag, the telephone number stored in the at least one electronic tag, the text (e.g., a name of an owner and/or entity of the at least one electronic tag) stored in the at least one electronic tag, the vCard file stored in the at least one electronic tag, or the serial number stored in the at least one electronic tag and the read tag identification information. Based on the matching result, when the stored tag information and the read tag identification information correspond to (i.e., match) each other, end device 110 may select a predefined function that is associated with the at least one electronic tag (i.e., the detected electronic tag). Then, end device 110 may perform the selected predefined function.

In some embodiments, end device 110 may be configured to pre-register and store reference motion information regarding at least one reference motion in a local memory. The reference motion may be associated with the at least one electronic tag and the at least one predefined function. Such a motion may be referred to as the reference motion, which may be a motion that is enacted by a user relative to, i.e., on or upon, end device 110 with the intention to execute one or more of the aforementioned predefined functions. In some embodiments, a depiction of the reference motion may be displayed for the user's reference on a display or a screen coupled to end device 110.

End device 110 may be configured to sense a motion that was enacted by a user thereon when end device 110 reads the tag identification information from the detected electronic tag. End device 110 may sense the motion by using one or more of well-known motion sensors such as a gyroscope, an accelerometer, or a motion detecting camera that are built-in, connected, or otherwise associated with end device 110. By way of example but not limitation, the motion enacted on end device 110 may refer to at least one of a posture of end device 110 at a certain time, a number of rotations of end device 110 during a predefined period of time, or a pattern of movement enacted by a user on end device 110.

As referenced herein, the "posture" of end device 110 may refer to the actual physical disposition of the device, as sensed by one or more of the associated gyroscope, accelerometer, motion detecting, camera, etc. The aforementioned disposition may be made with regard to geographic location, e.g., city, street address, latitude and longitude, cardinal direction (east, west, north, or south).

As referenced herein, a "certain time" may refer to a time at which a posture of end device 110, physical disposition of end device 110, or motion enacted upon end device 110 is sensed, detected, and/or recorded.

As referenced herein, a "number of rotations" of end device 110 may refer to a number that may be counted/recorded as the device rotates with regard to a virtual rotation axis.

End device 110 may be configured to implement a predefined function based on the reference motion information regarding the reference motion, motion information regarding the sensed motion enacted on end device 110, the tag information stored in the local memory of end device 110, and the tag identification information read by the reader. In some embodiments, end device 110 may be configured to calculate a quantified value of a motion correlation between the reference motion and the sensed motion enacted on end device 110. By way of example, but not limitation, each of the reference motion and the sensed motion enacted on end device 110 may include parameters such as at least one of a direction, a velocity, an acceleration, etc. End device 110 may be configured to calculate the quantified value of the motion correlation between the sensed motion enacted on end device 110 and the reference motion by comparing the parameters of the sensed motion enacted on end device 110 and the parameters of the reference motion.

End device 110 may be further configured to determine whether the calculated quantified value of the motion correlation is at least a predetermined value stored in the memory of end device 110. If the calculated quantified value of the motion correlation is at least the predetermined value, end device 110 may be configured to determine that the user of end device 110 enacted a motion that corresponds to the reference motion defined by the reference motion information. Then, end device 110 may be configured to select the predefined function which is associated with the reference motion and play the selected predefined function.

Thus, FIG. 1 shows example system configuration 100 in which one or more embodiments of function execution based on tag information may be implemented.

Figure 2:
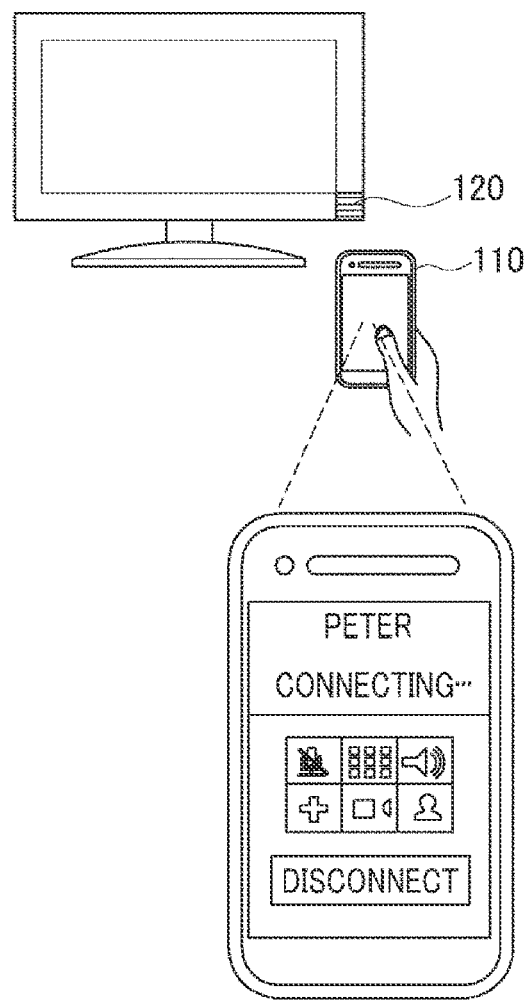
FIG. 2 shows an illustrative example of a system in which one or more embodiments of function execution based on tag information may be implemented.

FIG. 2 shows an illustrative example of a system in which one or more embodiments of function execution based on tag information may be implemented. In some embodiments, as depicted in FIG. 2, first electronic tag 120 may be attached to a surface of a first object (e.g., a computer monitor). End device 110 may be configured to read tag identification information from first electronic tag 120 by using a reader communicatively coupled to end device 110. The tag identification information received from first electronic tag 120 may include a unique identifier of first electronic tag 120, a uniform resource identifier (URI) of first electronic tag 120, a telephone number of an owner and/or entity that exercises control over first electronic tag 120 and/or associated content, a text (e.g., a name of the owner and/or entity) stored in first electronic tag 120, a vCard file stored in first electronic tag 120, or a serial number stored in first electronic tag 120.

By way of example, it may be assumed that end device 110 stores function information regarding a predefined function that initiates calling to an acquaintance (e.g., 'Peter') of the user of end device 110 in association with tag information regarding first electronic tag 120. The function information may include a name of the acquaintance (e.g., Peter) and a telephone number of the acquaintance. The tag information regarding first electronic tag 120 may include the unique identifier of first electronic tag 120, the uniform resource identifier (URI) of first electronic tag 120, the telephone number, the text, the vCard file, or the serial number stored in first electronic tag 120.

When end device 110 reads the tag identification information from first electronic tag 120, end device 110 may be configured to compare the read tag identification information of first electronic tag 120 with the tag information regarding first electronic tag 120 stored in association with the function information. Then, when end device 110 determines that the tag information and the read tag identification information correspond to (i.e., match) each other, end device 110 may select the predefined function that is associated with first electronic tag 120. Then, end device 110 may be configured to perform the selected predefined function (e.g., calling Peter).

Thus, FIG. 2 shows illustrative examples of the system in which one or more embodiments of function execution based on tag information may be implemented.

Figure 3:
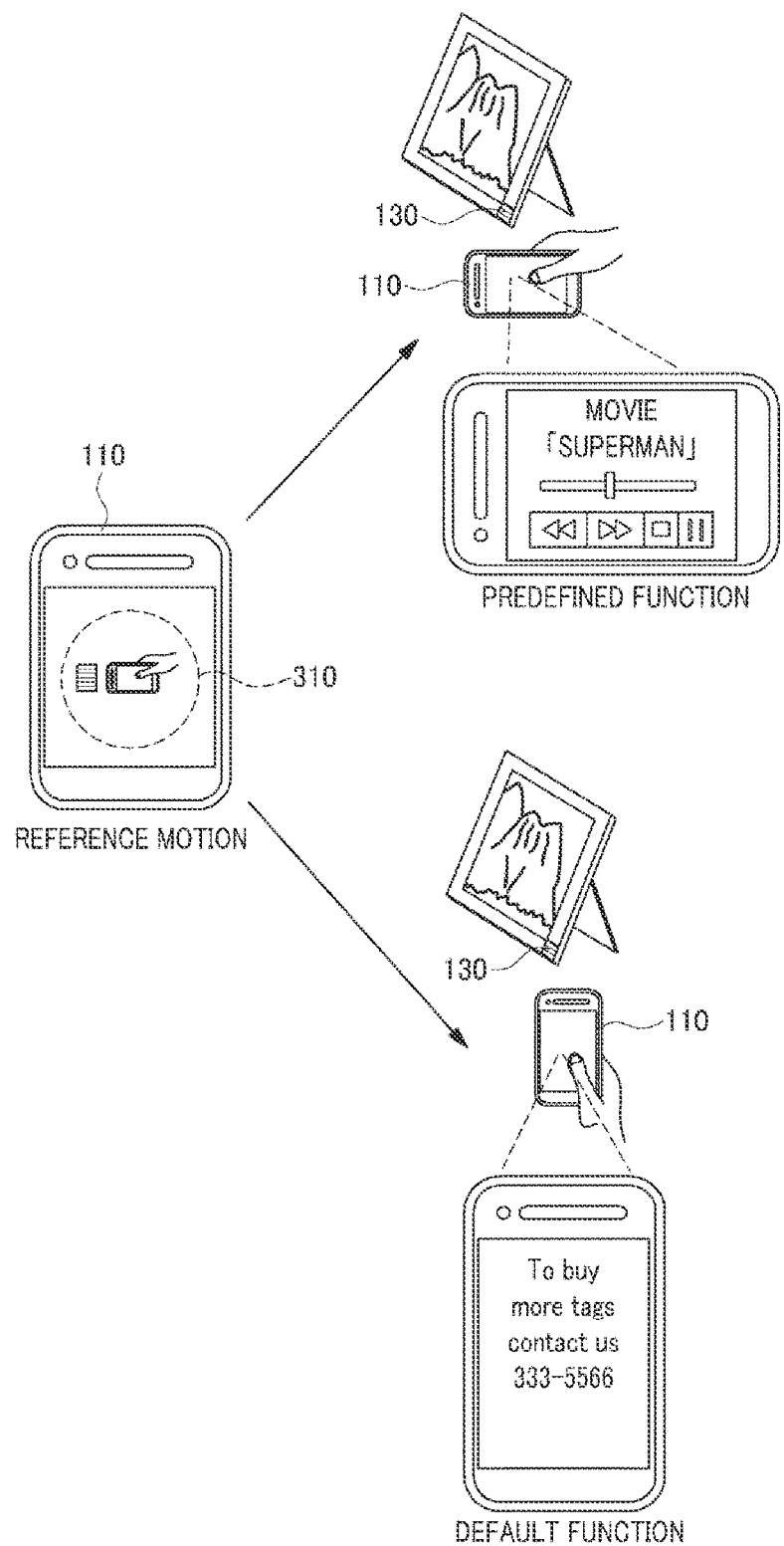
FIG. 3 shows yet another illustrative example of a system in which one or more embodiments of function execution based on tag information may be implemented.

FIG. 3 shows yet another illustrative example of a system in which one or more embodiments of function execution based on tag information may be implemented. In some embodiments, end device 110 may store reference motion information 310 in a local memory and be configured to display reference motion information 310 for the user's reference on a display or a screen coupled to end device 110, as depicted in FIG. 3.

By way of example, but not limitation, reference motion information 310 may depict a motion such as tilting end device 110 to e.g., the left when approaching or touching an electronic tag to read tag identification information from the electronic tag. Further to such example, if the user of end device 110 tilts end device 110 to the left while approaching or touching the electronic tag, end device 110 may sense the tilting motion to the left.

In some embodiments, it may be assumed that end device 110 pre-registers and stores reference motion information 310 regarding a predefined function, such as playing a movie (e.g., SUPERMAN) and tag information regarding second electronic tag 130. The tag information regarding second electronic tag 130 may include the unique identifier of second electronic tag 130, the uniform resource identifier (URI) of second electronic tag 130, the telephone number of an owner and/or entity that exercises control over second electronic tag 130 and/or associated content, the text (e.g., a name of the owner and/or entity) stored in second electronic tag 130, the vCard file stored in second electronic tag 130, or the serial number stored in second electronic tag 130.

As depicted in FIG. 3, second electronic tag 130 may be attached to a surface of a second object (e.g., a picture frame). End device 110 may be configured to read tag identification information from second electronic tag 130 by using a reader coupled to end device 110. The tag identification information received from second electronic tag 130 may include the unique identifier of second electronic tag 130, the uniform resource identifier (URI) of second electronic tag 130, the telephone number, the text, the vCard file, or the serial number stored in second electronic tag 130.

Then, end device 110 may be configured to determine whether the tag information and the read tag identification information correspond to (i.e., match) each other.

Further, end device 110 may be configured to sense a motion enacted thereon (e.g., the tilting motion to the left) at the time of approaching or touching second electronic tag 130. By way of example, but not limitation, the motion enacted on end device 110 may be sensed by using one or more of well-known motion sensors such as a gyroscope, an accelerometer and a motion detecting camera that are built-in, connected, or otherwise associated with end device 110.

Then, end device 110 may be configured to calculate a quantified value of a motion correlation between a reference motion defined by reference motion information 310 and the sensed motion enacted on end device 110. By way of example, but not limitation, each of the reference motion and the sensed motion enacted on end device 110 may include parameters such as at least one of a direction, a velocity, an acceleration, etc. End device 110 may be configured to calculate the quantified value of the motion correlation between the sensed motion enacted on end device 110 and the reference motion by comparing the parameters of the sensed motion enacted on end device 110 and the parameters of the reference motion.

Further, end device 110 may be configured to determine whether the calculated quantified value of the motion correlation is at least a predetermined value stored in the local memory of end device 110. If the calculated quantified value of the motion correlation is at least the predetermined value, end device 110 may be configured to determine that the user of end device 110 enacted a motion that corresponds to the reference motion defined by reference motion information 310.

When end device 110 determines that the stored tag information and the read tag identification information of second electronic tag 130 correspond to each other and that the user of end device 110 enacted a motion corresponding to the reference motion defined by reference motion information 310, end device 110 may select the predefined function that is associated with second electronic tag 130 and reference motion information 310. Then, end device 110 may be configured to perform the selected predefined function (e.g., playing the movie SUPERMAN).

Otherwise, when the user of end device 110 enacts a motion that does not correspond to reference motion information 310, end device 110 may sense the motion, calculate a quantified value of a motion correlation between the reference motion defined by reference motion information 310 and the sensed motion enacted on end device 110 by comparing parameters of the reference motion and the sensed motion, and determine that the user of end device 110 enacted a motion that does not correspond to the reference motion defined by reference motion information 310. Then, end device 110 may be configured to perform a default function. By way of example, but not limitation, each of electronic tags 120, 130, and 140 may have predefined default function information regarding at least one default function. The default function may be pre-registered and stored in each electronic tag by an owner and/or entity that exercises control over the each electronic tag. For example, end device 110 may store the default function information that indicates contact information of the owner and/or entity of second electronic tag 130. Then, when end device 110 determines that the user of end device 110 enacted a motion that does not correspond to the reference motion defined by reference motion information 310, as depicted in FIG. 3, end device 110 may perform the default function (e.g., displaying the contact information of the owner and/or entity of second electronic tag 130) and display an expression of the default function information (e.g., contact information of the owner and/or entity of second electronic tag 130) on a display or screen coupled to end device 110.

Thus, FIG. 3 shows yet other illustrative examples of the system in which one or more embodiments of function execution based on tag information may be implemented.

Figure 4:
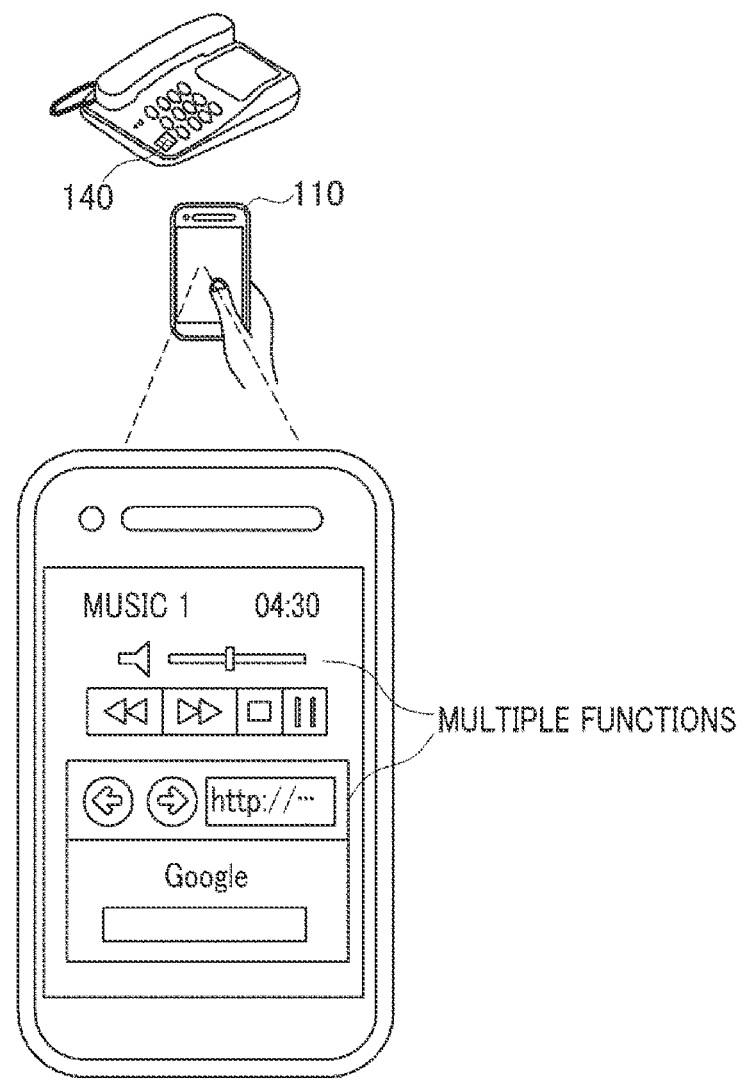
FIG. 4 shows yet a further illustrative example of a system in which one or more embodiments of function execution based on tag information may be implemented.

FIG. 4 shows yet a further illustrative example of a system in which one or more embodiments of function execution based on tag information may be implemented. In some embodiments, as depicted in FIG. 4, third electronic tag 140 may be attached to a surface of a third object (e.g., a telephone). End device 110 may be configured to read tag identification information from third electronic tag 140 by using a reader communicatively coupled to end device 110. The tag identification information received from third electronic tag 140 may include a unique identifier of third electronic tag 140, a uniform resource identifier (URI) of third electronic tag 140, a telephone number of an owner and/or entity that exercises control over third electronic tag 140 and/or associated context, a text (e.g., a name of the owner and/or entity) stored in third electronic tag 140, a vCard file stored in third electronic tag 140, or a serial number stored in third electronic tag 140.

In some embodiments, end device 110 may be configured to store function information regarding multiple predefined functions in association with tag information regarding third electronic tag 140. The tag information regarding third electronic tag 140 may include the unique identifier of third electronic tag 140, the uniform resource identifier (URI) of third electronic tag 140, the telephone number of an owner and/or entity that exercises control over third electronic tag 140 and/or associated content, the text of an owner and/or entity that exercises control over third electronic tag 140, the vCard file stored in third electronic tag 140, or the serial number stored in third electronic tag 140. The tag information stored in association with the function information may be the same as the tag identification information read from third electronic tag 140. By way of example, but not limitation, if two predefined functions are associated with the tag information regarding third electronic tag 140, a first predefined function among the two predefined functions, which initiates playing music is associated with the unique identifier of third electronic tag 140 and a second predefined function among the two predefined functions, which initiates a web browser on end device 110 is associated with the uniform resource identifier (URI) of third electronic tag 140.

When end device 110 reads the tag identification information read from third electronic tag 140, end device 110 may be configured to compare the read tag identification information of third electronic tag 140 with the tag information of third electronic tag 140 stored in association with the function information regarding the multiple predefined functions.

When end device 110 determines that the tag information associated with the multiple predefined functions corresponds to (i.e., matches) the tag identification information of third electronic tag 140, end device 110 may be configured to select the multiple predefined functions that are associated with third electronic tag 140. By way of example, but not limitation, when end device 110 determines that the tag identification information corresponds to the tag information, which is associated with the first predefined function, end device 110 may be configured to select a first predefined function, corresponding thereto. Further, when end device 110 determines that the tag identification information corresponds to the tag information, which is associated with the second predefined function, end device 110 may be configured to select another predefined function, corresponding thereto.

Further, end device 110 may be configured to perform, at least, the first predefined function and the second predefined function simultaneously or in a predetermined sequence.

In some embodiments, end device 110 may be configured to store function information regarding multiple predefined functions in association with reference motion information regarding at least one reference motion and the tag information regarding third electronic tag 140. When end device 110 senses a motion of end device 110 corresponding to the at least one reference motion, end device 110 may select the multiple predefined functions that are associated with the at least one reference motion based on motion information regarding the sensed motion enacted on end device 110 and the reference motion information regarding the at least one reference motion as well as the tag information and the read tag identification information.

Thus, FIG. 4 shows yet a further illustrative example of the system in which one or more embodiments of function execution based on tag information may be implemented.

Figure 5:
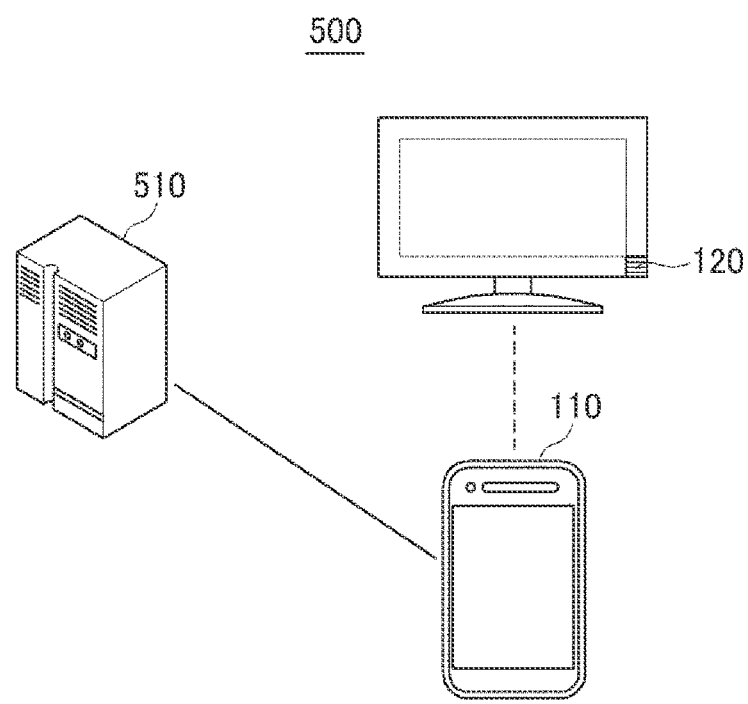
FIG. 5 shows an example system configuration in which one or more embodiments of service provision based on tag information may be implemented.

FIG. 5 shows an example system configuration 500 in which one or more embodiments of service provision based on tag information may be implemented. As depicted in FIG. 5, system configuration 500 includes, at least, end device 110, an object to a surface of which first electronic tag 120 is attached, and a service provider 510.

Service wider 510 may refer to an organization or entity that provides some type of communications, data storage, data or information processing, content service, or any combination thereof for business customers or consumers. Service provider 510 may host one or more servers or other processing apparatuses that may be configured to receive one or more service requests from at least one end device, and to provide the at least one end device with service information regarding at least one predefined service. Non-limiting example of service provider 510 may include an Internet service provider, i.e., ISP; application service provider, i.e., ASP; storage service provider, i.e., SSP; and television service provider, i.e., cable TV, DSL and DBS. Further, non-limiting example of expressions of the service information in response to the received request may include information regarding the subject matter that is displayed on the at least one end device.

Service provider 510 may be configured to pre-register and store tag information regarding at least one electronic tag, e.g., first electronic tag 120, in a local memory. By way of example, but not limitation, the tag information regarding first electronic tag 120 may include at least one of a unique identifier of first electronic tag 120, a uniform resource identifier (URI) of first electronic tag 120, a telephone number of an owner and/or entity that exercises control over first electronic tag 120 and/or associated content, a text (e.g., a name of the owner and/or entity) stored in first electronic tag 120, a vCard file stored in first electronic tag 120, or a serial number stored in first electronic tag 120.

In some embodiments, service provider 510 may be configured to be provided the tag information from end device 110 via a wired or wireless network and store the tag information in the local memory of service provider 510.

Service provider 510 may be further configured to pre-register and store service information regarding at least one predefined service in the local memory. The at least one predefined service may be associated with the at least one electronic tag including first electronic tag 120. By way of example, but not limitation, a single predefined service may be associated with one of a unique identifier of the single electronic tag, a uniform resource identifier (URI) of the single electronic tag, a telephone number, a text, a vCard file, or a serial number stored in the single electronic tag.

In some embodiments, an owner and/or entity that exercises control over end device 110 may predefine and store at least one service in association with the at least one electronic tag including first electronic tag 120. Further, service provider 510 may be provided service information regarding the at least one predefined service from end device 110 via a wired or wireless network and store the service information in the local memory.

In some embodiments, service provider 510 may be configured to receive, from end device 110, a service request that includes tag identification information regarding first electronic tag 120 via a wired or wireless network.

Service provider 510 may be further configured to receive the service request from end device 110. Further, service provider 510 may be configured to select a predefined service from among the at least one predefined service based on the tag information stored in the local memory of service provider 510 and the tag identification information received from end device 110. By way of example, but not limitation, service provider 510 may compare the tag information and the read tag identification information and, if the tag information stored in the local memory of service provider 510 and the read tag identification information received from end device 110 match each other, service provider 510 may select a predefined service that is associated with the tag information. Then, service provider 510 may transmit the service information regarding the selected predefined service to end device 110.

In some embodiments, service provider 510 may be configured to pre-register and store reference motion information regarding at least one reference motion in the local memory of service provider 510. The reference motion may be associated with the at least one predefined service. Such a motion may be referred to as the reference motion, which may be a motion that is enacted by a user of end device 110 relative to, i.e., on or upon, end device 110 with the intention to receive service information from service provider 510. In some embodiments, service provider 510 may be configured to receive the reference motion information from end device 110 via a wired or wireless network and store the reference motion information in the local memory of service provider 510.

Service provider 510 may be configured to receive, from end device 110, motion information regarding a motion that was enacted by the user relative to end device 110 via a wired or wireless network. End device 110 may sense the motion when end device 110 reads the tag identification information from first electronic tag 120 by using one or more of well-known motion sensors such as a gyroscope, an accelerometer and a motion detecting camera that are built-in, connected, or otherwise associated with end device 110 and transmit the motion information regarding the sensed motion to service provider 510.

Service provider 510 may be configured to select a predefined service from among the at least one predefined service based on the reference motion information regarding the reference motion, the received motion information of end device 110, the tag information stored in the local memory and the tag identification information received from end device 110. In some embodiments, service provider 510 may be configured to calculate a quantified value of a motion correlation between the reference motion information and the received motion information. By way of example, but not limitation, each of the reference motion information and the received motion information may include parameters such as at least one of a direction, a velocity, an acceleration, etc. Service provider 510 may be configured to calculate the quantified value of the motion correlation between the reference motion information and the received motion information by comparing the parameters of the reference motion information and the parameters of the received motion information. Further, service provider 510 may be configured to determine whether the calculated quantified value of the motion correlation is at least a predetermined value stored in the local memory of service provider 510. If the calculated quantified value of the motion correlation is at least the predetermined value, service provider 510 may be configured to determine that the user of end device 110 enacted a motion that corresponds to the reference motion defined by the reference motion information. Then, service provider 510 may be configured to select a predefined service which is associated with the reference motion and transmit the service information regarding selected predefined service to end device 110 via a wired or wireless network.

In some embodiments, service provider 510 may be configured to pre-register and store service information regarding multiple predefined services in association with the reference motion information regarding at least one reference motion. When service provider 510 receives, from end device 110, the motion information regarding the motion enacted on end device 110, which corresponds to the reference motion, service provider 510 may select the multiple predefined services that are associated with the reference motion based on the motion information and the reference motion information.

In some embodiments, service provider 510 may be configured to pre-register and store service information regarding multiple predefined services that are associated with the tag information regarding a single electronic tag (e.g., first electronic tag 120). Each of the multiple predefined services may be associated with one of the unique identifier of the single electronic tag, the uniform resource identifier (URI) of the single electronic tag, the telephone number of an owner or entity of the single electronic tag, the text (e.g., a name of the owner or entity) stored in the single electronic tag, the vCard file stored in the single electronic tag, or the serial number stored in the single electronic tag. By way of example, but not limitation, one predefined service among the multiple predefined services may be associated with the unique identifier of the single electronic tag, another of the predefined services may be associated with the uniform resource identifier (URI) of the single electronic tag and yet another of the predefined services may be associated with the telephone number stored in the single electronic tag.

By way of example, but not limitation, a first predefined service that activates a predetermined application on end device 110 is associated with one tag information (e.g., the unique identifier of first electronic tag 120) and a second predefined service that initiates a web browser on end device 110 is associated with another tag information (e.g., the serial number of first electronic tag 120).

In some embodiments, service provider 510 may be provided the service information regarding the multiple predefined services from end device 110 via a wired or wireless network and store the service information in the local memory of service provider 510.

Service provider 510 may be configured to receive the service request including the tag identification information regarding first electronic tag 120 from end device 110 via a wired or wireless network. Further, service provider 510 may be configured to select the multiple predefined services based on the tag information stored in the local memory and the tag identification information received from end device 110. Then, service provider 510 may be configured to provide service information regarding the selected multiple predefined services to end device 110.

In some embodiments, service provider 510 may be configured to pre-register and store device information regarding an end device that is allowed to perform the at least one predefined service in the memory of service provider 510. By way of example, but not limitation, the device information may include at least one of a unique identifier of the end device, a media access control (MAC) address of the end device, an internet protocol (IP) address of the end device, a uniform resource identifier (URI) stored in the end device, etc. In some embodiments, service provider 510 may be provided the stored device information from end device 110 via a wired or wireless network.

When service provider 510 received, from an end device, a service request including tag identification information regarding an electronic tag, service provider 510 may be configured to identify the end device which transmitted the service request to service provider 510 based on the stored device information. By way of example, but not limitation, service provider 510 may receive, from the end device, identifiers of the end device, such as a unique identifier of the end device or a media access control (MAC) address of the end device in addition to the service request. Then, service provider 510 may identify the end device by comparing the stored device information and the received identifiers of the end device.

When service provider 510 determines that the identified end device is allowed to perform the at least one predefined service, service provider 510 may transmit the service information regarding the selected predefined service to the identified end device.

Thus, FIG. 5 shows an example system configuration 500 in which one or more embodiments of service provision based on tag information may be implemented.

Figure 6:
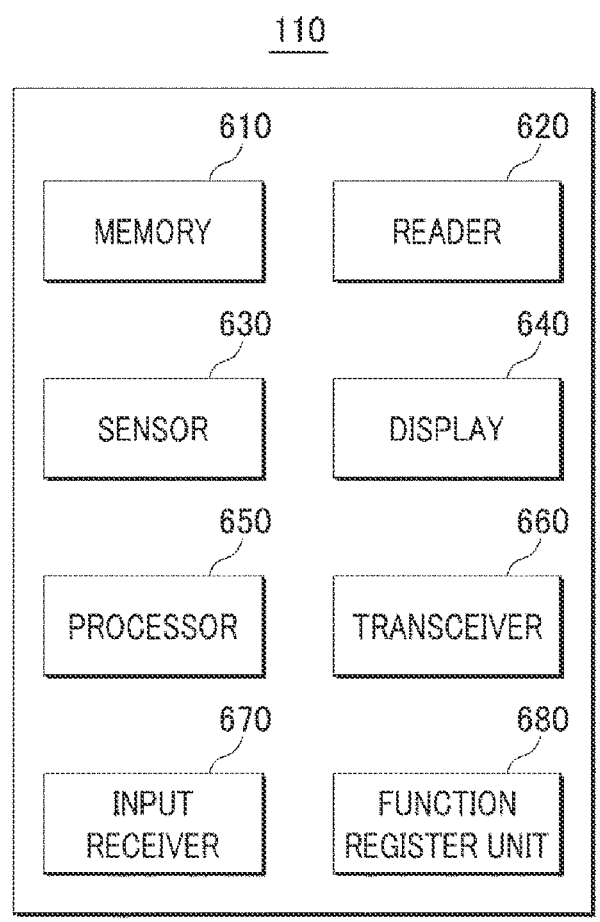
FIG. 6 shows an example configuration of an end device by which at least portions of function execution based on tag information may be implemented.

FIG. 6 shows an example configuration of end device 110 by which at least portions of function execution based on tag information may be implemented. As depicted in FIG. 6, end device 110 may include a memory 610, a reader 620, a sensor 630, a display 640, a processor 650, a transceiver 660, an input receiver 670 and a function register unit 680. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of memory 610, reader 620, sensor 630, display 640, processor 650, transmitter 660, input receiver 670 and function register unit 680 may be included in an instance of an application hosted on end device 110.

Memory 610 may be configured to store tag information regarding at least one electronic tag. By way of example, but not limitation, the tag information stored in memory 610 may include at least one of a unique identifier, a uniform resource identifier (URI), a telephone number of an owner or entity of the at least one electronic tag, a text (e.g., a name of the owner or entity) stored in the at least one electronic tag, a vCard file stored in the at least one electronic tag, or a serial number of the at least one electronic tag.

Memory 610 may be further configured to store function information regarding at least one predefined function that may be executed by/on end device 110. The at least one predefined function may be associated with the at least one electronic tag.

In some embodiments, memory 610 may be further configured to store reference motion information regarding at least one reference motion. The reference motion may be associated with the at least one electronic tag and at least one predefined function. Such a motion may be referred to as the reference motion, which may be a motion that is enacted by a user of end device 110 relative to, i.e., on or upon, end device 110 with the intention to execute a predefined function.

In some embodiments, memory 610 may be further configured to store function information regarding multiple predefined functions that are associated with the at least one electronic tag. Further, memory 610 may be configured to store function information regarding multiple predefined functions in association with the reference motion information and the at least one electronic tag.

Reader 620 may be configured to read tag identification information from a detected electronic tag located within a predetermined communication range of end device 110. By way of example, but not limitation, the tag identification information may include at least one of a unique identifier, a uniform resource identifier (URI), a telephone number of an owner or entity of the detected electronic tag, a text (e.g., a name of the owner or entity) stored in the detected electronic tag, a vCard file stored in the detected electronic tag, or a serial number of the detected electronic tag. By way of example, but not limitation, reader 620 may include a radio frequency identification reader, a near field communication reader, a barcode reader, a quick response code reader, etc.

Sensor 630 may be configured to sense a motion enacted on end device 110 when reader 620 reads the tag identification information from the detected electronic tag. Sensor 630 may sense the motion enacted on end device 110 by using one or more well-known motion sensors such as a gyroscope, an accelerometer and a motion detecting camera, etc.

Display 640 may be configured to display a depiction of the at least one reference motion for the user's reference. Further, display 640 may be configured to display service information regarding at least one predefined service received from service provider 510. Display 640 may be further configured to display a list of functions that includes the least one predefined function.

Processor 650 may be configured to select a predefined function based on the tag information stored in memory 610 and the tag identification information read by reader 620, and then perform the selected predefined function. Processor 650 may be configured to compare the tag information and the read tag identification information. When the stored tag information and the read tag identification information correspond to (i.e., match) each other, processor 650 may be configured to select the predefined function that is associated with the at least one electronic tag (i.e., the detected electronic tag). Then, processor 650 may be configured to perform the selected predefined function. If multiple predefined functions are stored in association with the tag information, processor 650 may be configured to select multiple functions based on the tag information stored in memory 610 and the tag identification information read by reader 620, and then perform the selected multiple predefined functions.

In some embodiments, processor 650 may be further configured to select a predefined function based on the reference motion information stored in memory 610, motion information regarding the motion sensed by sensor 630, the tag information stored in memory 610 and the tag identification information read by reader 620.

Processor 650 may be configured to calculate a quantified value of a motion correlation between the reference motion information and the motion information regarding the sensed motion. By way of example, but not limitation, each of the reference motion information and the motion information regarding the sensed motion may include parameters such as at least one of a direction, a velocity, an acceleration, etc. Processor 650 may be configured to calculate the quantified value of the motion correlation between the reference motion information and the motion information regarding the sensed motion by comparing the parameters of the motion information regarding the sensed motion and the parameters of the reference motion information. Further, processor 650 may be configured to determine whether the calculated quantified value of the motion correlation is at least a predetermined value stored in memory 610. If the calculated quantified value of the motion correlation is at least the predetermined value, processor 650 may be configured to select a predefined function which is associated with the reference motion.

Further, if multiple predefined functions are stored in association with the tag information and the reference motion information, processor 650 may be configured to select multiple functions based on the reference motion information stored in memory 610, the motion information regarding the motion sensed by sensor 630, the tag information stored in memory 610 and the tag identification information read by reader 620 and then, perform the selected multiple predefined functions.

Further, processor 650 may be configured to perform a default function when the calculated quantified value of the motion correlation is lower than the predetermined value.

Transceiver 660 may be configured to receive the service information regarding at least one predefined service from service provider 510. Transceiver 660 may be further configured to transmit a service request that includes the tag identification information read by reader 620 to service provider 510.

In some embodiments, transceiver 660 may be further configured to transmit the reference motion information to service provider 510. Transceiver 660 may be further configured to transmit the motion information regarding the motion sensed by sensor 630 to service provider 510.

In some embodiments, transceiver 660 may be further configured to transmit, to service provider 510, device information regarding at least one end device that is allowed to perform at least one predefined service provided service provider 510.

Input receiver 670 may be configured to receive an input that selects the at least one predefined function from the function list which is displayed by display 640 in order to predefine and store the at least one predefined function. By way of example, the input may be generated by a user of end device 110 by touching or clicking function identifier (e.g., function name or function identifier) of the at least one predefined function on the function list.

Function register unit 680 may be configured to register the function information regarding the selected at least one predefined function in association with the tag information in memory 610.

Thus, FIG. 6 shows an example configuration of end device 110 by which at least portions of function execution based on tag information may be implemented.

Figure 7:
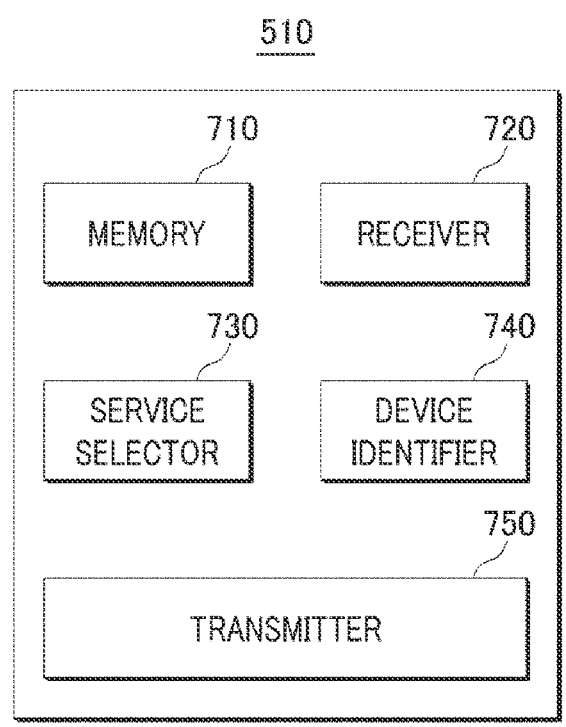
FIG. 7 shows an example configuration of a service provider by which at least portions of function execution based on tag information may be implemented.

FIG. 7 shows an example configuration of service provider 510 by which at least portions of function execution based on tag information may be implemented. As depicted in FIG. 7, service provider 510 may include a memory 710, a receiver 720, a service selector 730, a device identifier 740 and a transmitter 750. Although illustrated as discrete components, various components may be divided into additional components, combined into fewer components, or eliminated altogether while being contemplated within the scope of the disclosed subject matter. It will be understood by those skilled in the art that each function an or operation of the components may be implemented, individually and/or collectively, by a wide range of hardware, software, firmware, or virtually any combination thereof. In that regard, one or more of memory 710, receiver 720, service selector 730, device identifier 740 and transmitter 750 may be included in an instance of an application hosted by service provider 510.

Memory 710 may be configured to store tag information regarding at least one electronic tag. By way of example, but not limitation, the tag information stored in memory 710 may include at least one of a unique identifier, a uniform resource identifier (URI), a telephone number of an owner or entity of the at least one electronic tag and/or associated content, a text (e.g., a name of the owner or entity) stored in the at least one electronic tag, a vCard file stored in the at least one electronic tag, or a serial number of the at least one electronic tag.

Memory 710 may be further configured to store service information regarding at least one predefined service. Further, non-limiting examples of expressions of the service information include information regarding the subject matter that is displayed on at least one end device including end device 110. The at least one predefined service may be associated with the at least one electronic tag.

In some embodiments, memory 710 may be further configured to store reference motion information regarding at least one reference motion. The reference motion may be associated with the at least one electronic tag and at least one predefined service. Such a motion may be referred to as the reference motion, which may be a motion that is enacted by a user of end device 110 relative to, i.e., on or upon, end device 110 with the intention to receive the service information from service provider 510.

In some embodiments, memory 710 may be further configured to store service information regarding multiple predefined services which are associated with the at least one electronic tag. Further, memory 710 may be configured to store service information regarding multiple predefined services in association with the reference motion information and the at least one electronic tag.

In some embodiments, memory 710 may be further configured to store device information regarding an end device that is allowed to perform the at least one predefined service. By way of example, but not limitation, the device information may include at least one of a unique identifier of the end device, a media access control (MAC) address of the end device, an Internet protocol (IP) address of the end device, a uniform resource identifier (URI) stored in the end device, etc.

Receiver 720 may be configured to receive, from the at least one end device including end device 110, a service request that includes tag identification information of a detected electronic tag located within a predetermined communication range of the at least one end device. By way of example, but not limitation, the tag identification information may include at least one of a unique identifier, a uniform resource identifier (URI), a telephone number, a text, a vCard file, or a serial number of the detected electronic tag.

In some embodiments, receiver 720 may be further configured to receive, from end device 110, motion information regarding a motion which is enacted on end device 110 and sensed by end device 110. Further, receiver 720 may be configured to receive, from end device 110, the reference motion information.

In some embodiments, receiver 720 may be further configured to receive, from end device 110, the device information regarding an end device that is allowed to perform the at least one predefined service provided by service provider 510.

Service selector 730 may be configured to select a predefined service from among the at least one predefined service based on the tag information stored in memory 710 and the tag identification information received from end device 110. Service selector 730 may be configured to compare the tag information stored in memory 710 and the received tag identification information. When the stored tag information and the received tag identification information correspond to (i.e., match) each other, service selector 730 may be configured to select the predefined service that is associated with the at least one electronic tag (i.e., the detected electronic tag). If multiple predefined services are stored in association with the tag information, service selector 730 may be configured to select the multiple predefined services based on the tag information stored in memory 710 and the tag identification information received from end device 110.

In some embodiments, service selector 730 may be further configured to select a predefined service from among the at least one predefined service based on the reference motion information stored in memory 710, the motion information received from end device 110, the tag information stored in memory 710 and the tag identification information received from end device 110.

Service selector 730 may be configured to calculate a quantified value of a motion correlation between the reference motion information and the motion information regarding the motion enacted on end device 110. By way of example, but not limitation, each of the reference motion information and the motion information regarding the motion enacted on end device 110 may include parameters such as at least one of a direction, a velocity, an acceleration, etc. Service selector 730 may be configured to calculate the quantified value of the motion correlation between the reference motion information and the motion information regarding the motion of end device by comparing the parameters of the motion information regarding the motion enacted on end device 110 and the parameters of the reference motion information. Further, service selector 730 may be configured to determine whether the calculated quantified value of the motion correlation is at least a predetermined value stored in memory 710. If the calculated quantified value of the motion correlation is at least the predetermined value, service selector 730 may be configured to select a predefined service which is associated with the reference motion.

Further, if multiple predefined services are stored in association with the tag information and the reference motion information, service selector 730 may be configured to select the multiple predefined services based on the reference motion information stored in memory 710 and motion information regarding the motion enacted on end device 110 in addition to the tag information stored in memory 710 and the tag identification information received from end device 110.

Device identifier 740 may be configured to identify an end device which transmitted a service request to service provider 510 based on the device information stored in memory 710. By way of example, but not limitation, device identifier 740 may identify the end device by comparing the stored device information and an identifier of the end device.

Transmitter 750 may be configured to transmit service information regarding the predefined service selected by service selector 730 to end device 110. In some embodiments, transmitter 750 may be configured to transmit service information regarding the multiple predefined services selected by service selector 730 to end device 110. In some embodiments, transmitter 750 may be configured to transmit the service information to the end device which is identified by device identifier 740.

Thus, FIG. 7 shows an example configuration of service provider 510 by which at least portions of function execution based on tag information may be implemented.

Figure 8:
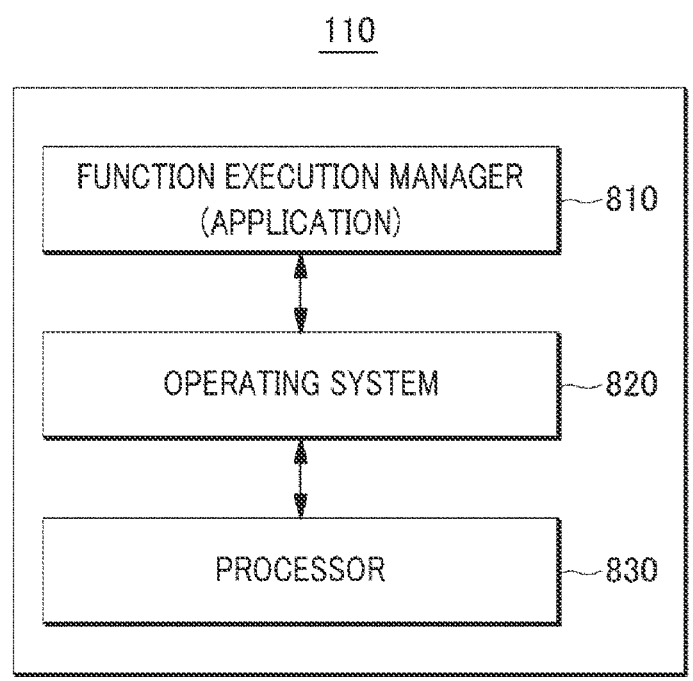
FIG. 8 shows still another example configuration of an end device by which at least portions of function execution based on tag information may be implemented.

FIG. 8 shows still another example configuration of end device 110 by which at least portions of function execution based on tag information may be implemented. As depicted, end device 110 may include function execution manager 810, an operating system 820 and a processor 830. Function execution manager 810 may be an application adapted to operate on operating system 820 such that the function executing schemes as described herein may be provided. Operating system 820 may allow function execution manager 810 to manipulate processor 830 to implement the function executing schemes as described herein.

Figure 9:
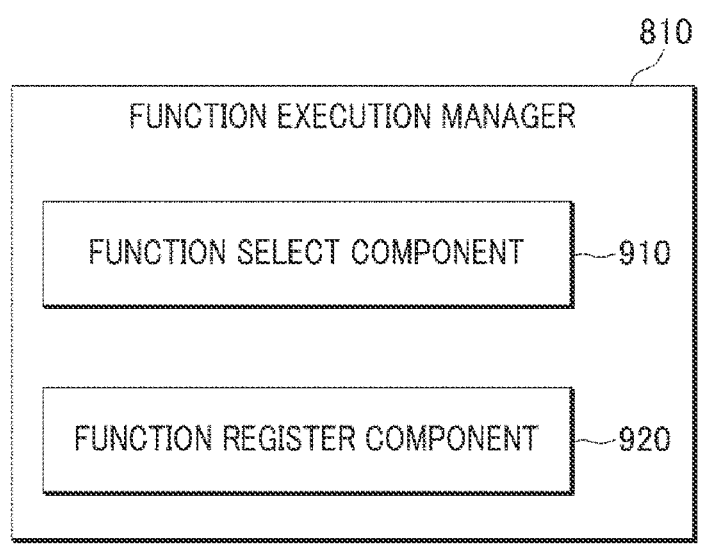
FIG. 9 shows an example configuration of a function execution manager by which at least portions of function execution based on tag information may be implemented.

FIG. 9 shows an example configuration of function execution manager 810 by which at least portions of function execution based on tag information may be implemented. As depicted, function execution manager 810 may include a function select component 910, and a function register component 920.

Function select component 910 may be configured to select a predefined function from among at least one predefined function based on tag information stored in a memory of end device 110 and tag identification information read by a reader and perform the selected predefined function. If multiple predefined functions are stored in association with the tag information in the memory, function select component 910 may be configured to select the multiple predefined functions based on the tag information and the tag identification information and then, perform the selected multiple predefined functions.

In some embodiments, function select component 910 may be further configured to select a predefined function from among the at least one predefined function based on reference motion information stored in the memory, motion information regarding a motion enacted on end device 110, the tag information and the tag identification information.

Further, if multiple predefined functions are stored in association with the tag information and the reference motion information in the memory, function select component 910 may be configured to select the multiple predefined functions based on the reference motion information, the motion information regarding the motion enacted on end device 110, the tag information and the tag identification information.

Function register component 920 may be configured to register function information regarding at least one predefined function in association with the tag information in the memory of end device 110.

Thus, FIG. 8 shows still another example configuration of end device 110 by which at least portions of function execution based on tag information may be implemented, and FIG. 9 shows an example configuration of function execution manager 810 by which at least portions of function execution based on tag information may be implemented.

Figure 10:
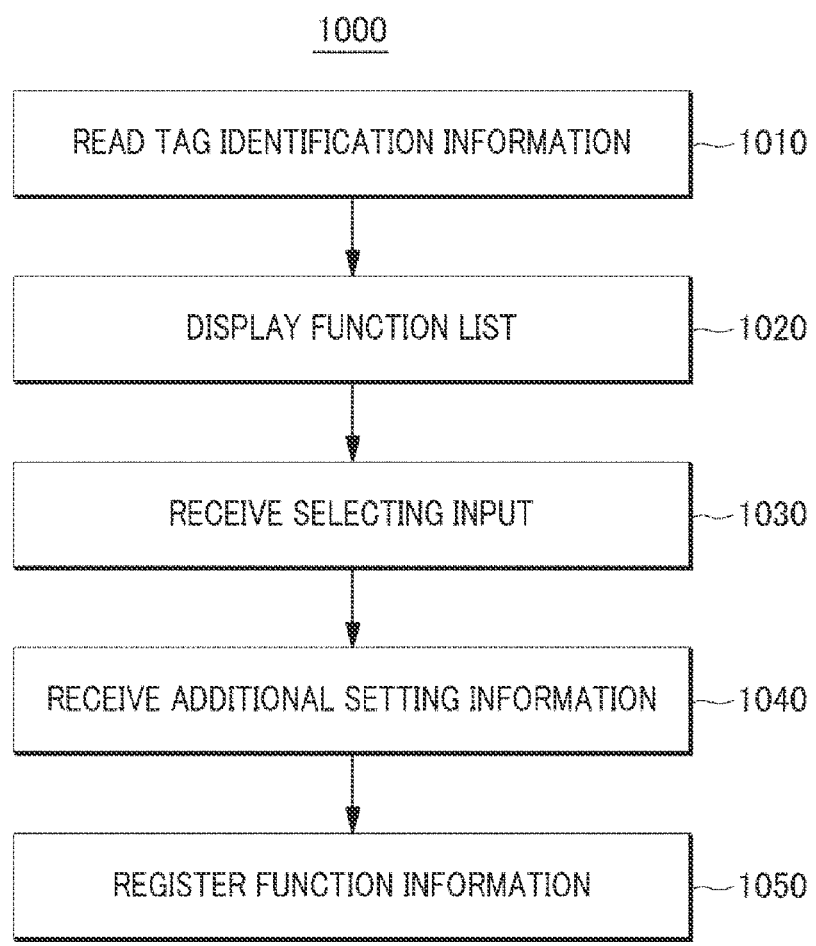
FIG. 10 shows an example processing flow of operations for implementing at least portions of registering function information by an end device.

FIG. 10 shows an example processing flow 1000 of operations for implementing at least portions of registering function information by end device 110. The process in FIG. 10 may be implemented in system configuration 100 including end device 110, first electronic tag 120, second electronic tag 130 and third electronic tag 140, as illustrated in FIG. 1. An example process may include one or more operations, actions, or functions as illustrated by one or more blocks 1010, 1020, 1030, 1040 and/or 1050. Although illustrated as discrete blocks, various blocks may be divided into additional blocks, combined into fewer blocks, or eliminated, depending on the desired implementation. Processing may begin at block 1010.

At block 1010 (Read Tag Identification Information), end device 110 may be configured to read tag identification information from an electronic tag located within a predetermined communication range of end device 110 by using a reader coupled to end device 110. By way of example, but not limitation, the tag identification information may include at least one of a unique identifier, a uniform resource identifier (URI), a telephone number of an owner or entity of the electronic tag and/or associated content, a text (e.g., a name of the owner or entity) stored in the electronic tag, a vCard file stored in the electronic tag, or a serial number of the electronic tag. By way of example, but not limitation, the reader may include a radio frequency identification reader, a near field communication reader, a barcode reader, a quick response code reader, etc. Processing may proceed from block 1010 to block 1020.

At block 1020 (Display Function List), end device 110 may be configured to display a list of functions which includes multiple functions executable by end device 110, such as making a call to an acquaintance, playing a movie, playing a music, activating an application, opening a web browser etc. End device 110 may display the list of functions on a screen or a display medium which is built-in or communicatively coupled to end device 110. Processing may proceed from block 1020 to block 1030.

At block 1030 (Receive Selecting Input), end device 110 may be configured to receive an input that selects at least one function from the list of functions that is displayed at block 1020. By way of example, the input may be generated by a user of end device 110 by touching or clicking function identifier (e.g., function name or function identifier) of the at least one function on the function list. Processing may proceed from block 1030 to block 1040.

At block 1040 (Receive Additional Setting Information), end device 110 may be configured to receive additional setting information regarding the execution of the at least one function. By way of example, but not limitation, the additional setting information may include additional instructions regarding such as playing order of multiple music, repeat number of playing a movie or repeat number of playing a music, etc. Processing may proceed from block 1040 to block 1050.

At block 1050 (Register Function Information), end device 110 may be configured to register and store function information regarding the at least one function selected at block 1030 in association with the tag identification information read at block 1010 in a memory of end device 110. Accordingly, end device 110 may be configured to register and store the selected at least one function as a predefined function.

Thus, FIG. 10 shows an example processing flow 1000 of operations for implementing at least portions of registering function information by end device 100.

Figure 11:
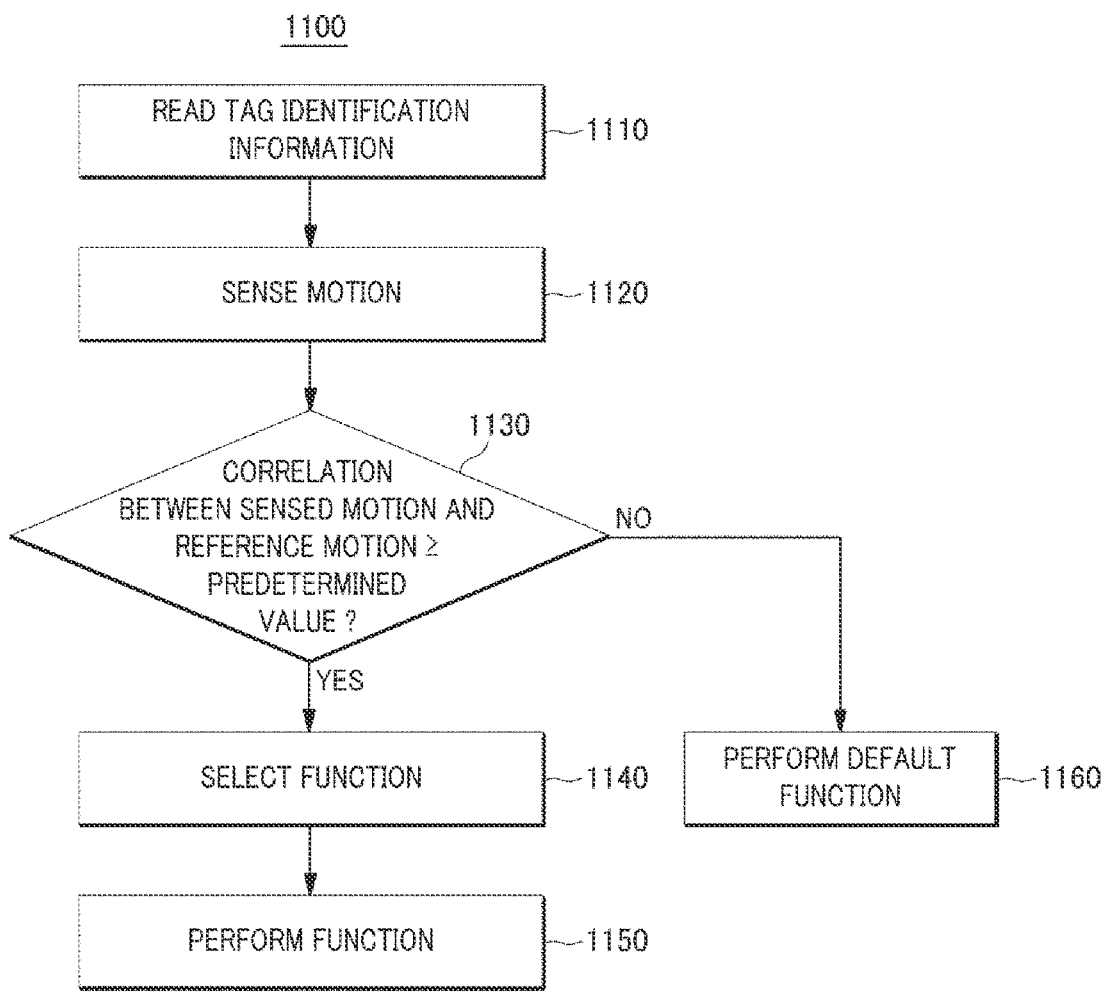
FIG. 11 shows an example processing flow of operations for implementing at least portions of function execution based on tag information by an end device.

FIG. 11 shows an example processing flow 1100 of operations for implementing at least portions of function execution based on tag information by end device 110. The process in FIG. 11 may be implemented in system configuration 100 including end device 110, first electronic tag 120, second electronic tag 130 and third electronic tag 140, as illustrated in FIG. 1. An example process may include one or more operations, actions, or functions as illustrated by one or more blocks 1110, 1120, 1130, 1140, 1150 and/or 1160. Although illustrated as discrete blocks, various blocks may be divided into additional blocks, combined into fewer blocks, or eliminated, depending on the desired implementation. Processing may begin at block 1110.

At block 1110 (Read Tag Identification Information), end device 110 may be configured to read tag identification information from a detected electronic tag located within a predetermined communication range of end device 110 by using a reader coupled to end device 110. By way of example, but not limitation, the tag identification information may include at least one of a unique identifier, a uniform resource identifier (URI), a telephone number of an owner or entity of the detected electronic tag and/or associated content, a text (e.g., a name of the owner or entity) stored in the detected electronic tag, a vCard file stored in the detected electronic tag, or a serial number of the detected electronic tag. By way of example, but not limitation, the reader may include a radio frequency identification reader, a near field communication reader, a barcode reader, a quick response code reader, etc. Processing may proceed from block 1110 to block 1120.

At block 1120 (Sense Motion), end device 110 may be configured to sense a motion enacted thereon when end device 110 reads the tag identification information from the detected electronic tag at block 1110. End device 110 may sense the motion by using one or more of well-known motion sensors such as a gyroscope, an accelerometer and a motion detecting camera, etc. Processing may proceed from block 1120 to block 1130.

At block 1130 (Determine whether Correlation between Sensed Motion and Reference Motion is quantifiable to be at least a predetermined Value), end device 110 may be configured to calculate a quantified value of a motion correlation between at least one reference motion and the motion sensed at Nock 1120. By way of example, but not limitation, each of the reference motion and the sensed motion may include parameters such as at least one of a direction, a velocity, an acceleration, etc. End device 110 may be configured to calculate the quantified value of the motion correlation between the sensed motion and the reference motion by comparing the parameters of the sensed motion and the parameters of the reference motion.

Further, at block 1130, end device 110 may be configured to determine whether the calculated quantified value of the motion correlation is at least a predetermined value stored in a memory of end device 110. If the calculated quantified value of the motion correlation is at least the predetermined value, processing may proceed from block 1130 to block 1140, while if the calculated quantified value of the motion correlation is lower than the predetermined value, processing may proceed from Nock 1130 to block 1160.

At block 1140 (Select Function), end device 110 may be configured to select at least one predefined function which is associated with the reference motion which is corresponds to the motion sensed at block 1120. Further, end device 110 may be configured to compare tag information stored in a memory and the read tag identification information. When the stored tag information and the read tag identification information correspond to (i.e., match) each other, end device 110 may be configured to select the at least one predefined function that is associated with the reference motion and the detected electronic tag. Processing may proceed from block 1140 to block 1150.

At block 1150 (Perform Function), end device 110 may be configured to perform the selected at least one predefined function. In some embodiments, if end device 110 selects multiple predefined functions, end device 110 may be configured to perform the selected multiple predefined functions simultaneously or in a predetermined sequence.

At block 1160 (Perform Default Function), end device 110 may be configured to perform a default function. By way of example, but not limitation, each electronic tag may have predefined default function information regarding at least one default function. The default function may be registered and stored in the each electronic tag by an owner and/or entity that exercises control over the each electronic tag. As set forth, non-limiting example of expressions of the default function may include information regarding the subject matter that is registered by the owner and/or entity of the electronic tag.

Thus, FIG. 11 shows an example processing flow 1100 of operations for implementing at least portions of function execution based on tag information by end device 110.

Figure 12:
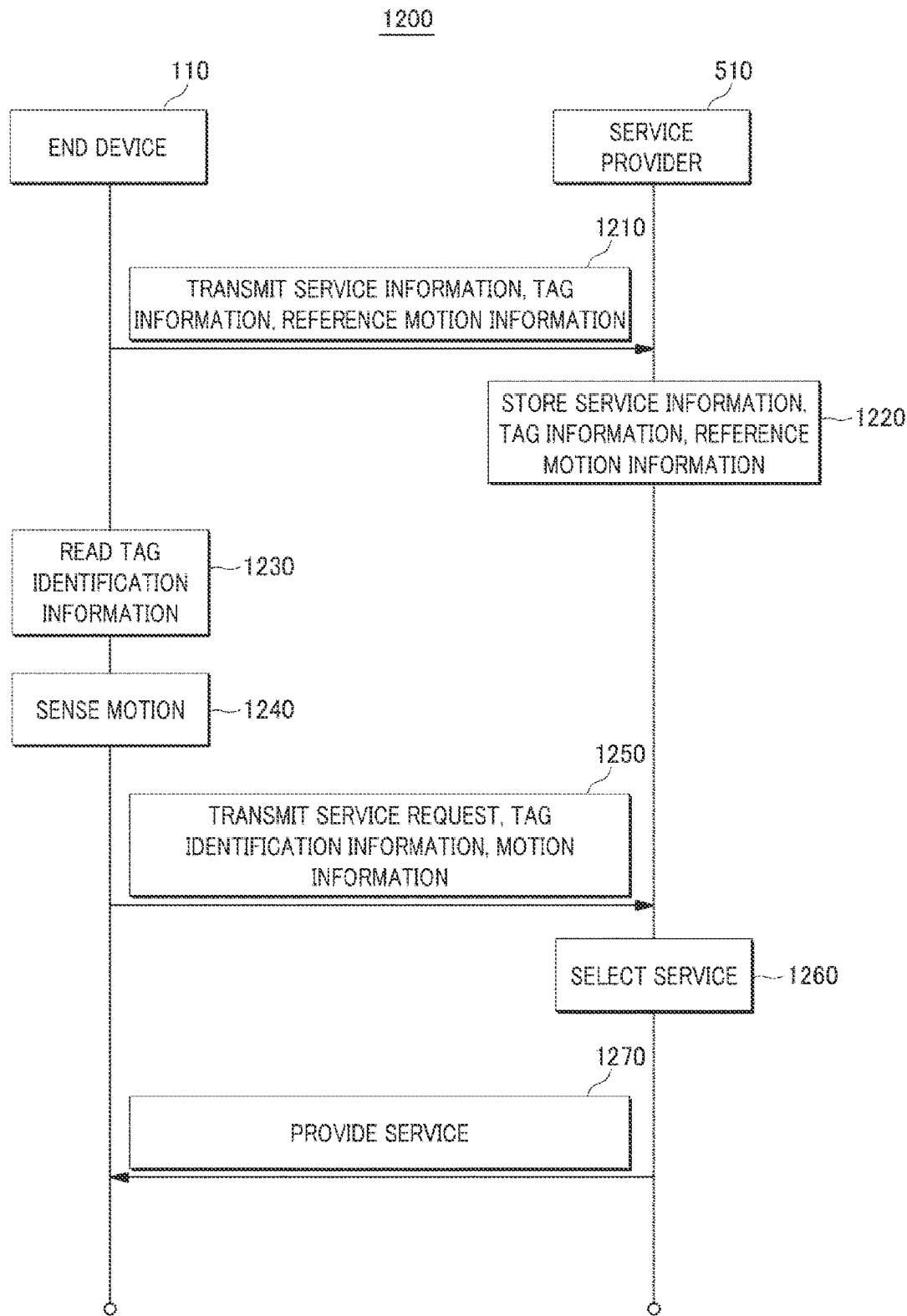
FIG. 12 shows an example processing flow of operations for implementing at least portions of service provision based on tag information.

FIG. 12 shows an example processing flow 1200 of operations for implementing at least portions of service provision based on tag information. The process in FIG. 12 may be implemented in system configuration 500 including end device 110 and service provider 510, as illustrated in FIG. 5. An example process may include one or more operations, actions, or functions as illustrated by one or more blocks 1210, 1220, 1230, 1240, 1250, 1260 and/or 1270. Although illustrated as discrete blocks, various blocks may be divided into additional blocks, combined into fewer blocks, or eliminated, depending on the desired implementation. Processing may begin at block 1210.

At block 1210 (Transmit Service Information, Tag Information and Reference Motion Information), end device 110 may be configured to transmit, to service provider 510, service information regarding at least one predefined service. As set forth above, non-limiting example of the predefined service may include any process or actions executable by end device 110 and/or service provider 510, such as activating an application, or certification regarding end device 110, etc. Further, at block 1210, end device 110 may be configured to transmit, to service provider 510, tag information regarding at least one electronic tag which is associated with the at least one predefined service. By way of example, but not limitation, the tag information may include at least one of a unique identifier, a uniform resource identifier (URI), a telephone number of an owner or entity of the at least one electronic tag and/or associated content, a text (e.g., a name of the owner or entity) stored in the at least one electronic tag, a vCard file stored in at least one electronic tag, or a serial number of the at least one electronic tag. Further, at block 1210, end device 110 may be configured to transmit reference motion information regarding at least one reference motion to service provider 510. Such a motion may be referred to as the reference motion, which may be a motion that is enacted by a user of end device 110 relative to, i.e., on or upon, end device 110 with the intention to receive service information from service provider 510. Processing may proceed from block 1210 to block 1220.

At block 1220 (Store Service Information, Tag Information and Reference Motion Information), service provider 510 may be configured to store the service information, tag information, and reference motion information received at block 1210 in a memory of service provider 510. Processing may proceed from block 1220 to block 1230.

At block 1230 (Read Tag Identification Information), end device 110 may be configured to read tag identification information from a detected electronic tag located within a predetermined communication range of end device 110 by using a reader coupled to end device 110. By way of example, but not limitation, the tag identification information may include at least one of a unique identifier, a uniform resource identifier (URI), a telephone number of an owner or entity of the detected electronic tag and/or associated content, a text (e.g., a name of the owner or entity) stored in the detected electronic tag, a vCard file stored in the detected electronic tag, or a serial number of the detected electronic tag. By way of example, but not limitation, the reader may include a radio frequency identification reader, a near field communication reader, a barcode reader, a quick response code reader, etc. Processing may proceed from block 1230 to block 1240.

At block 1240 (Sense Motion), end device 110 may be configured to sense a motion enacted thereon when end device 110 reads the tag identification information from the detected electronic tag at block 1230. End device 110 may sense the motion by using one or more of well-known motion sensors such as a gyroscope, an accelerometer and a motion detecting camera, etc. Processing may proceed from block 1240 to block 1250.

At block 1250 (Transmit Service Request, Tag Identification Information and Motion Information), end device 110 may be configured to transmit a service request that includes the tag identification information read at block 1230 to service provider 510. Further, at block 1250, end device 110 may be configured to transmit motion information regarding the motion sensed at block 1240 to service provider 510. Processing may proceed from block 1250 to block 1260.

At block 1260 (Select Service), service provider 510 may be configured to select a predefined service from among the at least one predefined service based on one or more of the reference motion information, the motion information, the tag information and the tag identification information. Processing may proceed from block 1260 to block 1270.

At block 1270 (Provide Service), service provider 510 may be configured to provide end device 110 with service information regarding the predefined service selected at block 1260.

Thus, FIG. 12 shows an example processing flow 1200 of operations for implementing at least portions of service provision based on tag information.

One skilled in the art will appreciate that for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 13:
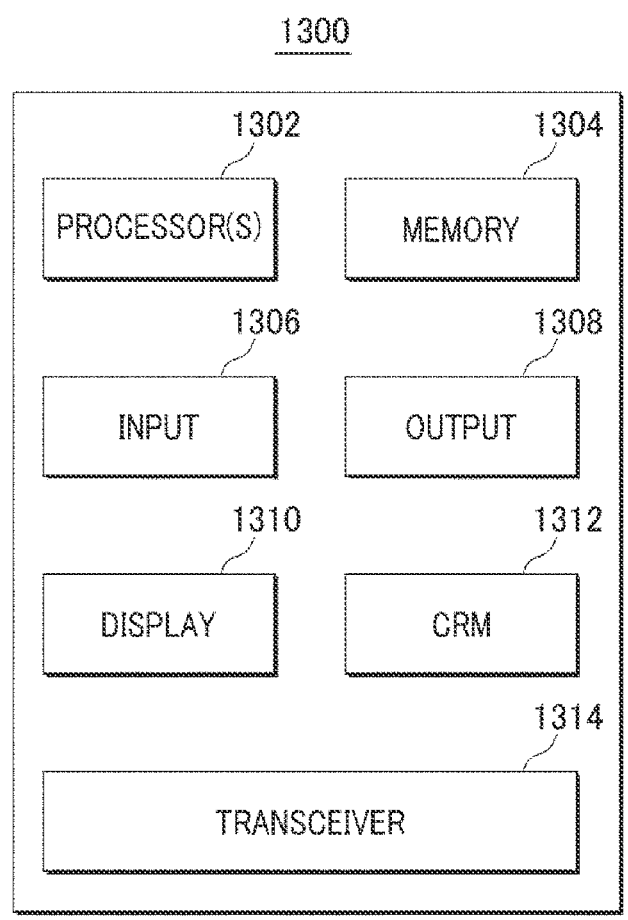
FIG. 13 shows an illustrative computing embodiment, in which any of the processes and sub-processes of function execution may be implemented as computer-readable instructions stored on a computer-readable medium.

FIG. 13 shows an illustrative computing embodiment, in which any of the processes and sub-processes of function execution may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 1300 may typically include, at least, one or more processors 1302, a system memory 1304, one or more input components 1306, one or more output components 1308, a display component 1310, a computer-readable medium 1312, and a transceiver 1314.

Processor 1302 may refer to, e.g., a microprocessor, a microcontroller, a digital signal processor, or any combination thereof.

Memory 1304 may refer to, e.g., a volatile memory, non-volatile memory, or any combination thereof. Memory 1304 may store, therein, an operating system, an application, and/or program data. That is, memory 1304 may store executable instructions to implement any of the functions or operations described above and, therefore, memory 1304 may be regarded as a computer-readable medium.

Input component 1306 may refer to a built-in or communicatively coupled keyboard, touch screen, or telecommunication device. Alternatively, input component 1306 may include a microphone that is configured, in cooperation with a voice-recognition program that may be stored in memory 1304, to receive voice commands from a user of computing device 1300. Further, input component 1306, if not built-in to computing device 1300, may be communicatively coupled thereto via short-range communication protocols including, but not limitation, radio frequency or Bluetooth.

Output component 1308 may refer to a component or module, built-in or removable from computing device 1300, that is configured to output commands and data to an external device.

Display component 1310 may refer to, e.g., a solid state display that may have touch input capabilities. That is, display component 1310 may include capabilities that may be shared with or replace those of input component 1306.

Computer-readable medium 1312 may refer to a separable machine readable medium that is configured to store one or more programs that embody any of the functions or operations described above. That is, computer-readable medium 1312, which may be received into or otherwise connected to a drive component of computing device 1300, may store executable instructions to implement any of the functions or operations described above. These instructions may be complimentary or otherwise independent of those stored by memory 1304.

Transceiver 1314 may refer to a network communication link for computing device 1300, configured as a wired network or direct-wired connection. Alternatively, transceiver 1314 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A server, comprising:
    a memory configured to:
        receive, from a first device, service information regarding at least one predefined service and tag information regarding at least one electronic tag that is associated with the at least one predefined service, and
        store the received service information;
    a receiver configured to receive, from the first device, a service request that includes tag identification information read from a detected electronic tag located within a predetermined range of the first device;
    a service selector configured to select a predefined service from among the at least one predefined service based on the stored tag information and the received tag identification information; and
    a transmitter configured to transmit the service information regarding the selected predefined service to the first device.

2. The server of claim 1, wherein the memory is further configured to store device information regarding a second device that is allowed to perform the at least one predefined service, and
    wherein the server further comprises a device identifier configured to:
        identify the second device that transmits a service request to the server, and
        determine that the identified second device is allowed to perform the at least one predefined service based on the device information, and
    wherein the transmitter is configured to transmit the service information to the identified second device.

3. The server of claim 1, wherein the memory is further configured to store reference motion information regarding at least one reference motion associated with the at least one predefined service,
- wherein the receiver is further configured to receive, from the first device, motion information regarding a motion that was enacted by the user relative to the first device, and
- wherein the service selector is configured to select the predefined service from among the at least one predefined service further based on the reference motion information and the received motion information.

4. A system, comprising:
- a first device configured to:
  - read tag identification information regarding a detected electronic tag located within a predetermined range of the first device, and
  - transmit a service request that includes the read tag identification information; and
- a server configured to:
  - receive, from the first device, service information regarding a plurality of predefined services and tag information regarding at least one electronic tag that is associated with respective ones of the plurality of predefined services,
  - store the received service information,
  - receive, from the first device, the service request,
  - select the predefined service from among the plurality of predefined services based on the tag identification information included in the received service request,
  - provide the first device with service information regarding one of the plurality of predefined services that is associated with the tag identification information included in the received service request,
  - the first device being further configured to perform the predefined service based on the provided service information.

5. The system of claim 4, wherein the plurality of predefined services are associated with a single electronic tag, and
- wherein the server is configured to provide the first device with the plurality of predefined services based on the tag identification information included in the service request.

6. The system of claim 5, wherein the stored tag information includes at least one of a unique identifier, a uniform resource identifier (URI), a telephone number, a text, a vCard file, or a serial number stored in the at least one electronic tag, and
- wherein each predefined service of the plurality of predefined services is associated with each of the at least one of the unique identifier, the uniform resource identifier (URI), the telephone number, the text, the vCard file, or the serial number stored in the at least one electronic tag.

7. The system of claim 4,
- wherein the server is further configured to:
  - store device information regarding a second device that is allowed to perform the plurality of predefined services,
  - identify the second device that transmits a service request to the server,
  - determine that the identified second device is allowed to perform the plurality of predefined services based on the device information, and
  - provide the service information to the identified second device.

8. The system of claim 4,
- wherein the server is further configured to store reference motion information regarding at least one reference motion that is associated with the plurality of predefined services,
- wherein the first device is further configured to:
  - sense a motion of the first device, and
  - transmit motion information regarding the sensed motion to the server, and
- wherein the server is further configured to:
  - receive the motion information from the first device,
  - determine whether a correlation between the sensed motion of the first device and the at least one reference motion is quantifiable to be at least a predetermined value, and
  - select the predefined service from among the plurality of predefined services when the correlation between the sensed motion and the at least one reference motion is quantifiable to be at least the predetermined value.

9. The system of claim 8, wherein the plurality of predefined services are associated with a single electronic tag and the at least one reference motion, and
- wherein the server is configured to provide the first device with the plurality of predefined services based on the read tag identification information included in the service request and the received motion information.

* * * * *